United States Patent
Ichikawa et al.

(10) Patent No.: US 6,265,479 B1
(45) Date of Patent: Jul. 24, 2001

(54) DEPROTEINIZING AGENT AND METHOD OF PREPARING CATIONIC DEPROTEINIZED NATURAL RUBBER LATEX USING THE SAME

(75) Inventors: Naoya Ichikawa, Himeji; Akihiko Hamada, Kakogawa; Masaharu Hayashi, Tokyo, all of (JP)

(73) Assignees: Sumitomo Rubber Industries, Ltd., Hyogo; Kao Corp., Tokyo, both of (JP)

( * ) Notice: Subject to any disclaimer, the term of this patent is extended or adjusted under 35 U.S.C. 154(b) by 0 days.

(21) Appl. No.: 09/657,411

(22) Filed: Sep. 8, 2000

(30) Foreign Application Priority Data

Sep. 10, 1999 (JP) .................................................. 11-257564

(51) Int. Cl.$^7$ ........................................................ C08L 7/02
(52) U.S. Cl. .................... 524/575.5; 528/488; 528/492; 528/931; 528/932; 528/934; 524/498; 524/925; 524/929; 523/332
(58) Field of Search .................................... 528/488, 492, 528/931, 932, 934; 524/498, 575.5, 925, 929; 523/333

(56) References Cited

U.S. PATENT DOCUMENTS

| | | | |
|---|---|---|---|
| 5,585,459 | * | 12/1996 | Tanaka et al. ........................ 528/486 |
| 5,622,998 | * | 4/1997 | Tanaka et al. ........................ 521/41 |
| 5,856,600 | * | 1/1999 | Tanaka et al. ........................ 585/241 |
| 5,908,893 | * | 6/1999 | Kawasaki et al. ................. 524/575.5 |
| 5,910,567 | * | 6/1999 | Tanaka et al. ........................ 528/491 |
| 5,914,367 | * | 6/1999 | Dordick et al. ...................... 525/54.1 |
| 5,962,147 | * | 10/1999 | Shalub et al. ........................ 428/492 |
| 6,107,455 | * | 8/2000 | Rosholm et al. ..................... 528/488 |

FOREIGN PATENT DOCUMENTS

| | | | |
|---|---|---|---|
| 0584597 | * | 2/1994 | (EP) . |
| 656904 | | 3/1994 | (JP) . |
| 656905 | | 3/1994 | (JP) . |
| 656906 | | 3/1994 | (JP) . |
| 925468 | | 1/1997 | (JP) . |
| 10259360 | | 9/1998 | (JP) . |

OTHER PUBLICATIONS

A.D. Roberts, Natural Rubber Science and Technology, pp. 94 & 95 (1988).

* cited by examiner

Primary Examiner—Samuel A. Acquah

(57) ABSTRACT

Disclosed are a deproteinizing agent comprising a proteolytic enzyme and one or more cationic surfactants selected from the group consisting of an alkylamine salt, an alkylamine derivative and quaternized compounds thereof; and a method of preparing a cationic deproteinized natural rubber latex, which comprises adding said deproteinizing agent to a field latex or an ammonia-treated latex thereby subjecting the latex to a deproteinization treatment and purifying the rubber particles in the latex.

5 Claims, 3 Drawing Sheets

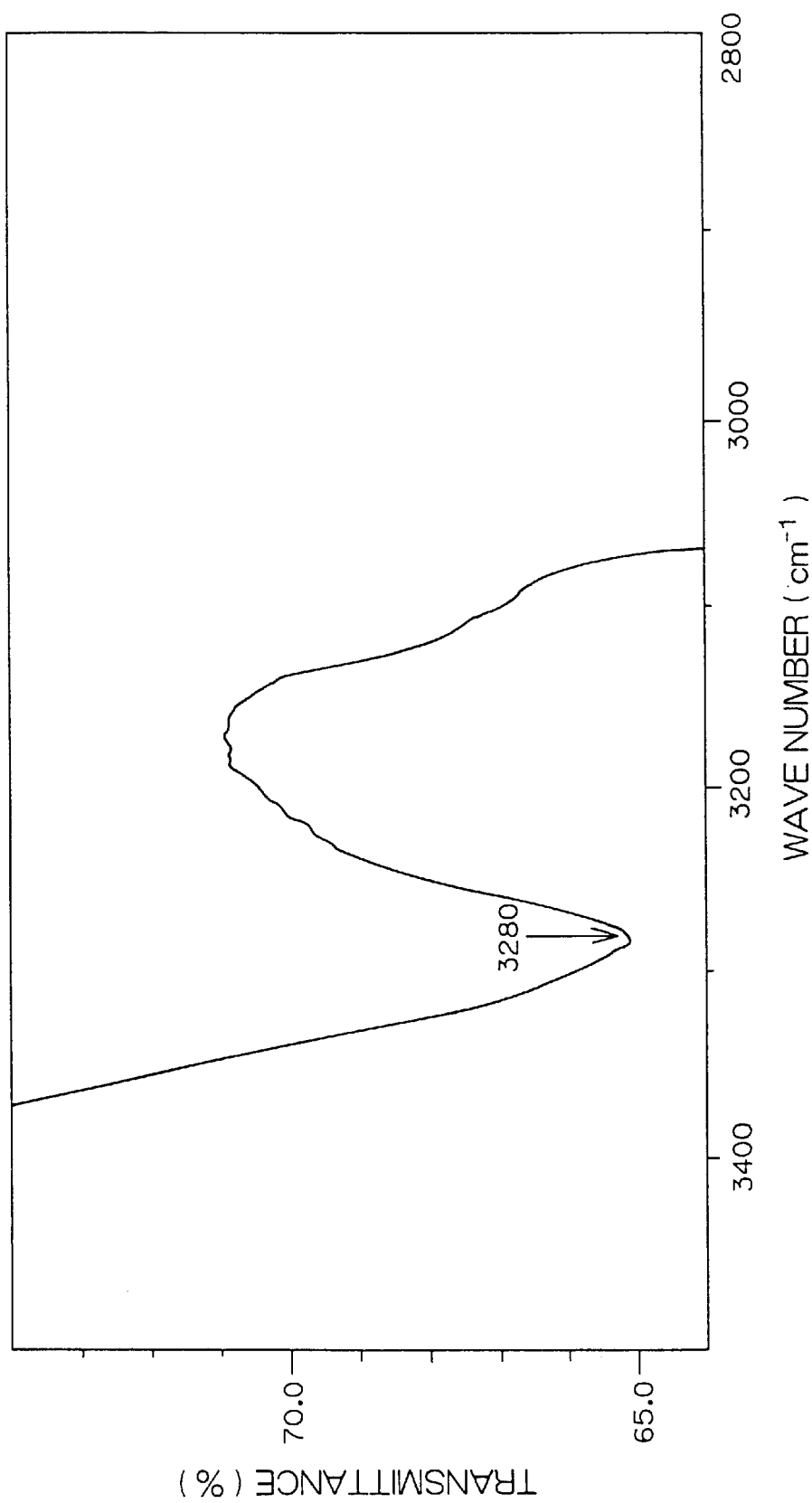

DEPROTEINIZING AGENT AND METHOD OF PREPARING CATIONIC DEPROTEINIZED NATURAL RUBBER LATEX USING THE SAME

BACKGROUND OF THE INVENTION

The present invention relates to a deproteinizing agent used to obtain a deproteinized natural rubber latex which is stable and exhibits cationic properties, wherein a protein in a natural rubber is removed, and a method of preparing a cationic deproteinized natural rubber latex using the same.

Although a natural rubber latex contains a protein as a non-rubber component other than the rubber component, the kind and amount of the protein vary depending on the producing district and producing season, thereby causing problems such as scatter in quality and vulcanization characteristics of a final natural rubber product as well as deterioration of qualities of the natural rubber product, for example, mechanical characteristics such as creep characteristics and aging resistance, and electrical characteristics such as insulating properties.

Also there has recently been reported the case where a strong I type allergic symptom is caused by a protein in a natural rubber when using a natural rubber product.

To solve these problems, a method of concentrating a natural rubber latex by washing with water and a method of concentrating the latex by washing in the presence of a surfactant are disclosed, however, insufficient deproteinization degree was attained by these methods.

Also a trial of solving these problems has been made by a method of efficiently removing a protein from a natural rubber latex disclosed in Japanese Published Unexamined Patent (Kokai Tokkyo Koho Hei) Nos. 6-56904, 6-56905 and 6-56906. Such a method is characterized in that a proteolytic enzyme (protease) and an anionic or nonionic surfactant are added to a natural rubber latex, thereby to decompose a protein, and then a creamy rubber component is separated by a purification treatment such as centrifugation to remove the protein.

However, the surfactant used in the method of the publications described above is anionic or nonionic and rubber particles in the deproteinized natural rubber latex are negatively charged or in the state free from polarity.

Accordingly, it was not preferable to use, as a raw material for an adhesive, such a rubber latex in the adherend, which is negatively charged originally, such as fibers and paper products.

On the other hand, a cationic natural rubber latex incorporated with cetyltrimethylammonium bromide (CTAB) as a cationic surfactant is described in pages 94 to 95 of "Natural Rubber Science and Technology" (edited by A. D. Roberts, published by Oxford University Publication, 1988). As described in such a reference document, when a sufficient amount of the cationic surfactant is added to the natural rubber, a latex comprising rubber particles having cations can be obtained. The latex is made cationic in such way, thereby making it possible to improve the close adhesion with the fibers or papers which are negatively charged when treated in water.

However, deproteinization can not be attained as a matter of course only by adding the cationic surfactant and the allergic reaction occurs, thereby making it impossible to provide a natural rubber latex which is stable to the human body.

Furthermore, there is such a problem that the viscosity increases with a lapse of time to form a solidified substance in case the cationic surfactant is merely added in the natural rubber latex, thereby making it impossible to obtain a stable latex.

SUMMARY OF THE INVENTION

Thus, an object of the present invention is to provide a deproteinizing agent used to obtain a natural rubber latex which exhibits cationic properties and also has high safety and stability, and a method of preparing a cationic deproteinized natural rubber latex using the same.

The present inventors have intensively studied to solve the problems described above and found such a novel finding that, when the natural rubber latex is subjected to a deproteinization treatment by incorporating a specific cationic surfactant, it is made possible to obtain a stable latex wherein the formation of a solidified substance is sufficiently suppressed and to obtain a latex having high safety to the human body wherein the occurrence of the allergic reaction is sufficiently suppressed. Thus, the present invention has been completed.

The deproteinizing agent of the present invention comprises a proteolytic enzyme and one or more cationic surfactants selected from the group consisting of alkylamine salt, alkylamine derivative and quaternized compounds thereof.

According to the deproteinizing agent of the present invention, in case the dispersed state of rubber particles unstabilized by the deproteinization is stabilized, the latex is not positively charged, like a conventional deproteinized natural rubber latex. Since a specific cationic surfactant is incorporated in a latex subjected to a deproteinization treatment, the formation of a solidified substance can be sufficiently suppressed thereby making it possible to provide a stable latex. Furthermore, since a protein in a natural rubber latex is removed by the deproteinization treatment, the occurrence of the allergic reaction can be sufficiently suppressed, thereby making it possible to provide a natural rubber latex having high safety to the human body.

The method of preparing a cationic deproteinized natural rubber latex is characterized by adding the deproteinizing agent to a field latex or ammonia-treated latex and purifying rubber particles in the latex.

In the method of preparing a cationic deproteinized natural rubber latex described above, the deproteinizing agent is preferably added so that the content of the cationic surfactant in the deproteinizing agent is within a range from 0.1 to 20 parts by weight based on 100 parts by weight of the rubber solid content in the latex, and the deproteinizing agent is preferably added so that the content of the proteolytic enzyme in the deproteinizing agent is within a range from 0.0001 to 20 parts by weight based on 100 parts by weight of the rubber solid content in the latex.

BRIEF DESCRIPTION OF THE DRAWINGS

FIG. 3 is a graph showing an infrared absorption spectrum of the solid film obtained in Comparative Example 6.

MODE FOR CARRYING OUT THE INVENTION

Figure 1:
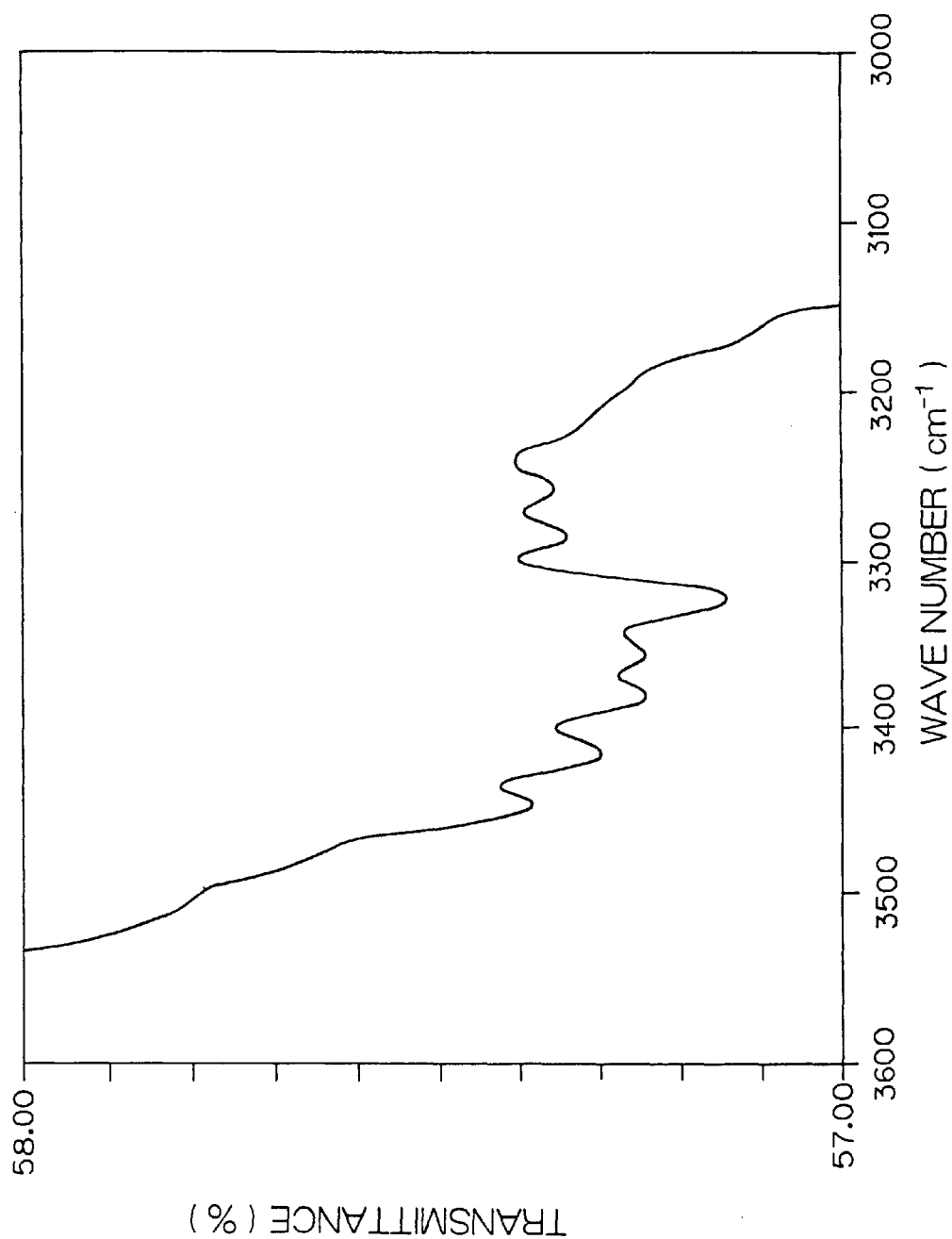
FIG. 1 is a graph showing an infrared absorption spectrum of the solid film obtained in Example 9.

The present invention will be described in detail below.

[Deproteinization treatment]

(Proteolytic enzyme)

The proteolytic enzyme used in the deproteinizing agent of the present invention is not specifically limited and a conventionally known one can be used and, for example, alkaline protease is preferable. The protease may be derived from any of bacteria, filamentous bacteria and yeast, and the protease is preferably derived from bacteria, particularly preferably from the genus Bacillus. It is also possible to use enzymes such as lipase, esterase, amylase, lacase and cellulase in combination.

As the proteolytic enzyme used in the present invention, for example, protease KAP having a resistance to the surfactant manufactured by Kao Corp. is used particularly preferably among the enzymes described above.

When using alkaline protease as the proteolytic enzyme, its activity [measured value obtained by modification of the Anson-hemoglobin method (Anson. M. L. J. Gen. Physiol., 22, 79 (1938))] is within a range from 0.1 to 50 APU/g, and preferably within a range from 1 to 25 APU/g.

When using the deproteinizing agent of the present invention, the amount of the proteolytic enzyme is preferably within a range from 0.0001 to 20 parts by weight, and more preferably within a range from 0.001 to 10 parts by weight, based on 100 parts by weight of the rubber component of the natural rubber latex. When the amount of the proteolytic enzyme is within the range described above, a protein in the latex can be sufficiently decomposed and the activity of the enzyme is retained. Alternatively, the effect corresponding to the addition can be exerted and, therefore, it is advantageous in view of the cost.

(Surfactant)

In case the cationic deproteinized natural rubber latex of the present invention is prepared, (i) for the purpose of stably dispersing a rubber component in a latex on decomposition of a protein, and (ii) for the purpose of improving the dispersion stability and storage stability of the latex and positively charging rubber particles in the latex to form a suspension of cation charged particles in water, one or more cationic surfactants and one or more nonionic surfactants as a stabilizer are used in the latex.

Examples of the cationic surfactant used in the present invention include alkylamine salt, alkylamine derivative and quaternized compound thereof.

Examples of the alkylamine salt include, but are not limited to, salts of primary amine, secondary amine and tertiary amine. Examples of the salt include hydrochloride, phsophate, acetate, alkyl sulfate, alkylbenzenesulfonic acid, alkylnaphthalenesulfonic acid, fatty acid, organic acid, alkyl phosphate, alkyl ether carboxylic acid, alkylamide ether carboxylic acid, anionic oligomer, and anionic polymer.

The alkylamine derivative has at least one of an ester group, an ether group and an amide group in a molecule and examples thereof include polyoxyalkylene (AO) alkylamine and a salt thereof, alkyl ester amine (including AO adduct) and a salt thereof, alkyl ether amine (including AO adduct) and a salt thereof, alklyamideamine (including AO adduct) and a salt thereof, alkyl ester amideamine (including AO adduct) and a salt thereof, and alkyl ether amideamine (including AO adduct) and a salt thereof. Examples of the salt include hydrochloride, phosphate, acetate, alkyl sulfate, alkylbenzenesulfonic acid, alkylnaphthaleensulfonic acid, fatty acid, organic acid, alkyl phosphate, alkyl ether carboxylic acid, alkylamide ether carboxylic acid, anionic oligomer, and anionic polymer.

Specific examples of the acetate include coconutamine acetate and stearylamine acetate.

The alkyl group in the alkylamine salt and alkylamine derivative usually includes, but is not limited to, straight-chain, branched or Guerbet-shaped alkyl groups having 8 to 22 carbon atoms.

Examples of the quaternized compound of the alkylamine salt and alkylamine derivative include those prepared by quaternizing the alkylamine salt and alkylamine derivative with methyl chloride, methyl bromide, or dimethylsulfuric acid.

The quaternary ammonium salt includes, for example, those having a $C_{8-22}$ alkyl group and, more specifically, it includes, for example, alkyltrimethylammonium halide such as lauryltrimethylammonium halide, cetyltrimethylammonium halide, or stearyltrimethylammonium halide; dialkydimethylammonium halide such as distearyldimethylammonium halide; trialkylmethylammonium halide; dialkylbenzylmethylammonium halide; or alkylbenzyldimethylammonium halide.

Among the cationic surfactants described above, cetyltrimethylammonium chloride (CTAC) and stearyltrimethylammonium chloride are preferably used in the present invention because of particularly excellent effect of stabilizing the latex.

When using the deproteinizing agent of the present invention, the amount of the cationic surfactant is within a range from 0.1 to 20% by weight, and more preferably within a range from 0.5 to 15% by weight, based on 100 parts by weight of the rubber component of the latex. When the amount of the cationic surfactant is within the above range, the cationic surfactant is not sufficiently adsorbed in the rubber particles of the latex and low moisture-absorption properties of the solid rubber are retained on drying of the latex, thereby making it possible to effectively exert the effect corresponding to the amount. Therefore, it is advantageous in view of the cost.

(Other Additives)

When using the proteolytic enzyme and cationic surfactant described above as the deproteinizing agent, other additives such as pH adjustors may be used in combination.

Examples of the pH adjustor include phosphate such as potassium dihydrogenphosphate, dipotassium hydrogenphosphate or disodium hydrogenphosphate, acetate such as potassium acetate or sodium acetate, sulfate, hydrochloride, nitrate, citrate, succinate, ammonia, sodium hydroxide, potassium hydroxide, sodium carbonate, and sodium hydrogencarbonate.

[Method of Preparing Cationic Deproteinized Natural Rubber Latex]

In the preparation of the cationic deproteinized natural rubber latex using an agent for treating a deproteinized natural rubber, it is preferable to use a method of adding an agent for treating a deproteinized natural rubber of the present invention to a natural rubber latex as a starting material, thereby subjecting the natural rubber latex to a deproteinization treatment, and subjecting latex particles to a purification treatment thereby to remove a decomposition product of a protein.

(Latex as Raw Material)

As the latex which is a starting material used to obtain the cationic deproteinized natural rubber latex of the present invention, there can be used conventionally known various natural rubber latexes such as ammonia-retaining concentrated natural rubber latex (concentration of rubber component: about 60%) and field latex (concentration of rubber component: about 30%) collected from rubber trees.

(Deproteinization Treatment)

The deproteinization treatment is conducted by adding an agent for treating a deproteinized natural rubber of the present invention to the latex as the raw material, as described above, and maturing the latex for about several tens minutes to one week, more preferably about 1 to 3 days. This maturing treatment may be conducted while stirring the latex or allowing it to stand. If necessary, the temperature may be controlled and is controlled within a range from 5 to 90° C., and preferably from 20 to 60° C. to obtain sufficient activity of the enzyme. When the temperature is lower than 5° C., there is a fear that the enzyme reaction does not proceed. On the other hand, when the temperature exceeds 90° C., there is a fear that the enzyme is devitalized.

The purification treatment of the rubber particles in the latex after the deproteinization treatment includes, but is not specifically limited to, a treatment of concentrating the latex by centrifugation or ultrafiltration and separating the non-rubber component transferred in water such as protein decomposition product and the rubber particles in the latex, or a treatment of separating the rubber particles by cohesion using an acid.

(Degree of Deproteinization)

The degree of the deproteinization attained by the deproteinizing agent of the present invention is adjusted so that the nitrogen content (N%) determined the Kjeldahl method is 0.1% or less, preferably 0.05% or less, and more preferably 0.02% or less. When the nitrogen content exceeds the above range, there is a fear that the occurrence of the allergic reaction can not be sufficiently suppressed because of insufficient degree of the deproteinization.

In the present invention, since the alkylamine salt, alkylamine derivative or quaternized compounds thereof is used as the cationic surfactant, the nitrogen content of the cationic surfactant is also included in the nitrogen content determined the Kjeldahl method. It is necessary to determine the amount of the protein adsorbed to the rubber component in the following manner. That is, the amount of the cationic surfactant in serum obtained by centrifugation is measured by a total amine valance or modification of the Epton method to determine the amount of the cationic surfactant contained in the cream component, and then the nitrogen content of the cationic surfactant is corrected.

The degree of the deproteinization can also be confirmed by the presence or absence of adsorption and degree of adsorption on the basis of the protein by means of an infrared absorption spectrum. In the rubber treated by using the deproteinizing agent of the present invention, an absorption at 3320 cm$^{-1}$ derived from short-chain peptide or amino acid may be observed. However, it is preferable that an absorption at 3280 cm$^{-1}$ derived from polymer peptide as a cause for allergy is small. It is more preferable that any absorption at 3280 cm$^{-1}$ is not observed.

[Applications for Cationic Deproteinized Natural Rubber Latex]

The cationic deproteinized natural rubber latex whose protein was efficiently removed obtained by the method of the present invention is not only used in the fields where a conventional natural rubber is used, for example, groves, contraceptive appliances, medical supplies, threads, solid rubber products, sporting goods, and tires, but also used preferably as a self-adhesive/adhesive for negatively charged objects such as papers and fibers.

EXAMPLES

The following Examples and Comparative Examples further illustrate the present invention.

Cationic surfactants used in the following Examples and Comparative Examples are as follows. Laurylamine hydrochloride ($C_{12}H_{25}NH_2.HCl$): content of active component is 70% by weight Coconutamine acetate [general formula: $R.NH_2.AcOH$] ($R=C_nH_{n+1}$, n=8 to 18) manufactured by Kao Corp. under the trade name of "Acetamin 24": content of active component is 98% by weight Polyoxyethylene (10) cocoalkylamine [general formula: $R.N[(CH_2CH_2O)_mH]$ $[(CH_2CH_2O)_nH]]$ (m+n=10) Polyoxyethylene (10) stearyamine.polyoxyethylene (4,5) lauryl ether carboxylate [general formula: $C_{18}H_{37}N^+[(CH_2CH_2O)_mO][(CH_2CH_2O)_nO].O^-OCH_2C(CH_2CH_2O)_{4,5}.C_{12}H_{25}]$ (m+n=10) Sterayltrimethylammonium chloride ($C_{18}H_{37}N^+(CH_3)_3$ .$Cl^-$) manufactured by Kao Corp. under the trade name of "Quartamin 86W": content of active component is 28% by weight Didecyldimethylammonium chloride (($C_{10}H_{21})_2(CH_3)N^+CH_3.Cl^-$) manufactured by Kao Corp. under the trade name of "Quartamin D10P": content of active component is 75% by weight Benzalkonium chloride ($C_{14}H_{29}(CH_3)_2.(C_6H_5CH_2)N^+.Cl^-$) manufactured by Kao Corp. under the trade name of "Sanisol C": content of active component is 50% by weight

[Preparation of Cationic Deproteinized Natural Rubber Latex]

Examples 1 to 5, 7 and 8

167 parts by weight (rubber component: 100 parts by weight) of a high ammonia latex containing a rubber component in a concentration of 60% by weight was diluted with 167 parts by weight of deionized water, and then cationic surfactants and enzymes (proteolytic enzyme, alkaline protease) shown in Table 1 were added in the proportion shown in the same table.

The latex was subjected to a deproteinization treatment by allowing to stand at 35° C. for 24 hours, and then centrifuged at 10000 rpm (gravity acceleration of about 9000 G) for about 30 minutes. After the completion of the centrifugation, a cream component as a separated upper layer was removed and dispersed again by adding deionized water in the amount of 15 parts by weight based on 100 parts by weight of the cream component.

The dispersion thus obtained was poured on a glass plate and then dried under reduced pressure for one to two days. Thereafter, the nitrogen content was determined by the Kjeldahl method and was taken as an index of the amount of the residual protein.

In the measurement of the nitrogen content according to the Kjeldahl method, the amount of the surfactant adsorbed to the rubber component and that of the surfactant in serum after centrifugation were measured by a total amine valance and the nitrogen content was corrected by using the resulting value so as to remove an influence of the cationic surfactant.

Example 6

Aforementioned high ammonia latex was diluted and the same deproteinizing agent as that used in Example 5 was added in the same proportion. Then, the deproteinization treatment was conducted in the same manner as in Example 5 and the cream component as the upper layer was removed.

To 100 parts by weight of the cream component, 15 parts by weight of an aqueous 1 wt % solution of the same cationic surfactant (stearyltrimetylammonium chloride) as that used in the above deproteinization treatment was added thereby to disperse the cream component again, and then the centrifugation treatment [10000 rpm (gravity acceleration of about 9000 G) for 30 minutes] was conducted again.

After the completion of the second centrifugation treatment, the separated cream component was removed and then dispersed again in deionized water and dried under reduced pressure in the same manner as in Example 5.

Comparative Examples 1 to 5

167 parts by weight (rubber component: 100 parts by weight) of a high ammonia latex containing a rubber component in a concentration of 60% by weight was diluted with 167 parts by weight of deionized water, and then cationic surfactants shown in Table 1 were added in the same proportion as that shown in Table 1.

Then, the latex was centrifuged at 10000 rpm (gravity acceleration of about 9000 G) for about 30 minutes. After the completion of the centrifugation, a cream component as a separated upper layer was removed and dispersed again by adding deionized water in the amount of 15 parts by weight based on 100 parts by weight of the cream component.

The dispersion thus obtained was poured on a glass plate and then dried under reduced pressure for one to two days. Thereafter, the nitrogen content was determined by the Kjeldahl method and was taken as an index of the amount of the residual protein.

The kind and amount of the cationic surfactants used in the respective Examples and Comparative Examples, amount of the proteolytic enzyme and number of the centrifugation treatments are shown in Table 1.

TABLE 1

|  | Cationic surfactants Kinds | Amount* | Amount of enzyme added** | Number of centrifugation treatments |
|---|---|---|---|---|
| Example 1 | Laurylamine hydrochloride | 7.0 | 0.07 | 1 |
| Example 2 | Coconutamine hydrochloride | 7.0 | 0.07 | 1 |
| Example 3 | Polyoxyethylene (10) cocoalkylamine | 5.0 | 0.07 | 1 |
| Example 4 | Polyoxyethylene (10) stearylamine cocoalkylamine | 10.0 | 0.07 | 1 |
| Example 5 | Sterayltrimethylammonium chloride | 16.7 | 0.07 | 1 |
| Example 6 | Sterayltrimethylammonium chloride | 16.7 | 0.07 | 2 |
| Example 7 | Didecyldimethylammonium chloride | 6.7 | 0.07 | 1 |
| Example 8 | Benzalkonium chloride | 10.0 | 0.07 | 1 |
| Comp. Example 1 | Laurylamine hydrochloride | 7.0 | — | 1 |
| Comp. Example 2 | Polyoxyethylene (10) cocoalkylamine | 5.0 | — | 1 |
| Comp. Example 3 | Polyoxyethylene (10) stearylamine.cocoalkylamine | 10.0 | — | 1 |
| Comp. Example 4 | Sterayltrimethylammonium chloride | 16.7 | — | 1 |
| Comp. Example 5 | Sterayltrimethylammonium chloride | 16.7 | — | — |

In Table 1, the amount of the enzyme with the symbol * represents a proportion (by weight) of the active component in the surfactant, i.e. parts by weight based on 100 parts by weight of the solid content of the natural rubber latex.

In Table 1, the amount of the enzyme with the symbol ** represents parts by weight of a proteolytic enzyme (alkaline protease) based on 100 parts by weight of the solid content of the natural rubber latex.

(Evaluation of Characteristics of Latex)

With respect to the latexes obtained in the Examples and Comparative Examples described above, the following characteristics were evaluated.

(i) Nitrogen content

According to the Kjeldahl method, the total amount of nitrogen in the latex solid content was determined. The values shown in Tables 2 and 3 are values wherein the nitrogen content based on nitrogen atoms in the surfactant was corrected.

(ii) Initial viscosity

With respect to the latex after one day has passed since the preparation, the viscosity was measured under the conditions of a #2 or #3 rotor, a rotating speed of 60 rpm and a temperature of 25° C. using a BM type viscometer and the resulting value was taken as an initial viscosity.

(iii) Change in appearance of latex during storage

The appearance of the latex after 10 days have passed since the preparation and that of the latex after 30 days have passed since the preparation were visually observed and it was confirmed whether the separation between a cream component and serum occurred or not.

The results are shown in Table 2.

TABLE 2

|  | Nitrogen content (% by weight) | Initial viscosity (mPa · s) | Change in appearance | |
|---|---|---|---|---|
|  |  |  | After 10 days | After 30 days |
| Example 1 | 0.04 | 40 | No change | No change |
| Example 2 | 0.04 | 37 | No change | No change |
| Example 3 | 0.04 | 45 | No change | No change |
| Example 4 | 0.04 | 45 | No change | No change |
| Example 5 | 0.03 | 40 | No change | No change |
| Example 6 | 0.02 | 35 | No change | No change |
| Example 7 | 0.04 | 55 | No change | No change |
| Example 8 | 0.04 | 90 | No change | No change |
| Comp. Example 1 | 0.15 | 60 | Separated | Separated |
| Comp. Example 2 | 0.13 | 90 | tendency to separation | Separated |
| Comp. Example 3 | 0.13 | 100 | Tendency to separation | Tendency to separation |
| Comp. Example 4 | 0.11 | 60 | tendency to separation | Tendency to separation |
| Comp. Example 5 | 0.25 | 30 | Separated | Separated |

As is apparent from Table 2, a deproteinized natural rubber latex having stable cationic properties can be prepared by subjecting to the deproteinization treatment using the treating agent of the present invention.

On the other hand, in the Comparative Examples wherein the latex is not subjected to the deproteinization treatment using a proteolytic enzyme, there arose problems that the latex is completely separated or it becomes impossible to supply in the state of the latex because of sign of separation (tendency to separation).

[Preparation of Cationic Deproteinized Natural Rubber Latex]

Example 9

To 167 parts by weight (rubber component: 100 parts by weight) of a high ammonia latex containing a rubber component in a concentration of 60% by weight, 450 parts by weight of deionized water was added, and then 0.07 parts by weight of alkaline protease [manufactured by Kao Corp. under the trade name of "KP-3939"] and 16.7 parts by weight of stearyltrimethylammonium chloride [manufactured by Kao Corp. under the trade name of "Quartamin 86W"] was incorporated to prepare a latex with the solid content TSC of 15%.

The latex was subjected to a deproteinization treatment by allowing to stand at 35° C. for 24 hours, and then centrifuged at 10000 rpm (gravity acceleration of about 9000 G) for about 30 minutes.

After the completion of the centrifugation, a cream component as a separated upper layer was removed and dispersed again by adding deionized water in the amount of 15 parts by weight based on 100 parts by weight of the cream component.

The dispersion thus obtained was poured on a glass plate and then dried under reduced pressure for one to two days. Thereafter, the nitrogen content was determined by the Kjeldahl method and the infrared absorption spectrum was measured.

Example 10

In the same manner as in Example 9, except that the centrifugation treatment was conducted twice, the deproteinization treatment, redispersion of the cream component and drying under reduced pressure were conducted and then the measurement of the nitrogen content and measurement of the infrared absorption spectrum were conducted.

Comparative Example 6

To 167 parts by weight (rubber component: 100 parts by weight) of a high ammonia latex containing a rubber component in a concentration of 60% by weight, 450 parts by weight of deionized water was added, and then 16.7 parts by weight of stearyltrimethylammonium chloride [manufactured by Kao Corp. under the trade name of "Quartamin 86W"] was incorporated to prepare a latex with the solid content TSC of 15%.

The latex was subjected to a deproteinization treatment by allowing to stand at 35° C. for 24 hours, and then centrifuged at 10000 rpm (gravity acceleration of about 9000 G) for about 30 minutes.

After the completion of the centrifugation, a cream component as a separated upper layer was removed and dispersed again by adding deionized water in the amount of 15 parts by weight based on 100 parts by weight of the cream component.

The dispersion thus obtained was poured on a glass plate and then dried under reduced pressure for one to two days. Thereafter, the nitrogen content was determined by the Kjeldahl method and the infrared absorption spectrum was measured.

(Measurement of Infrared Absorption Spectrum)

The solid film used in the measurement of the nitrogen content in Examples 9 and 10 and Comparative Example 6 was placed on a KBr disc, the infrared absorption spectrum was measured.

Figure 2:
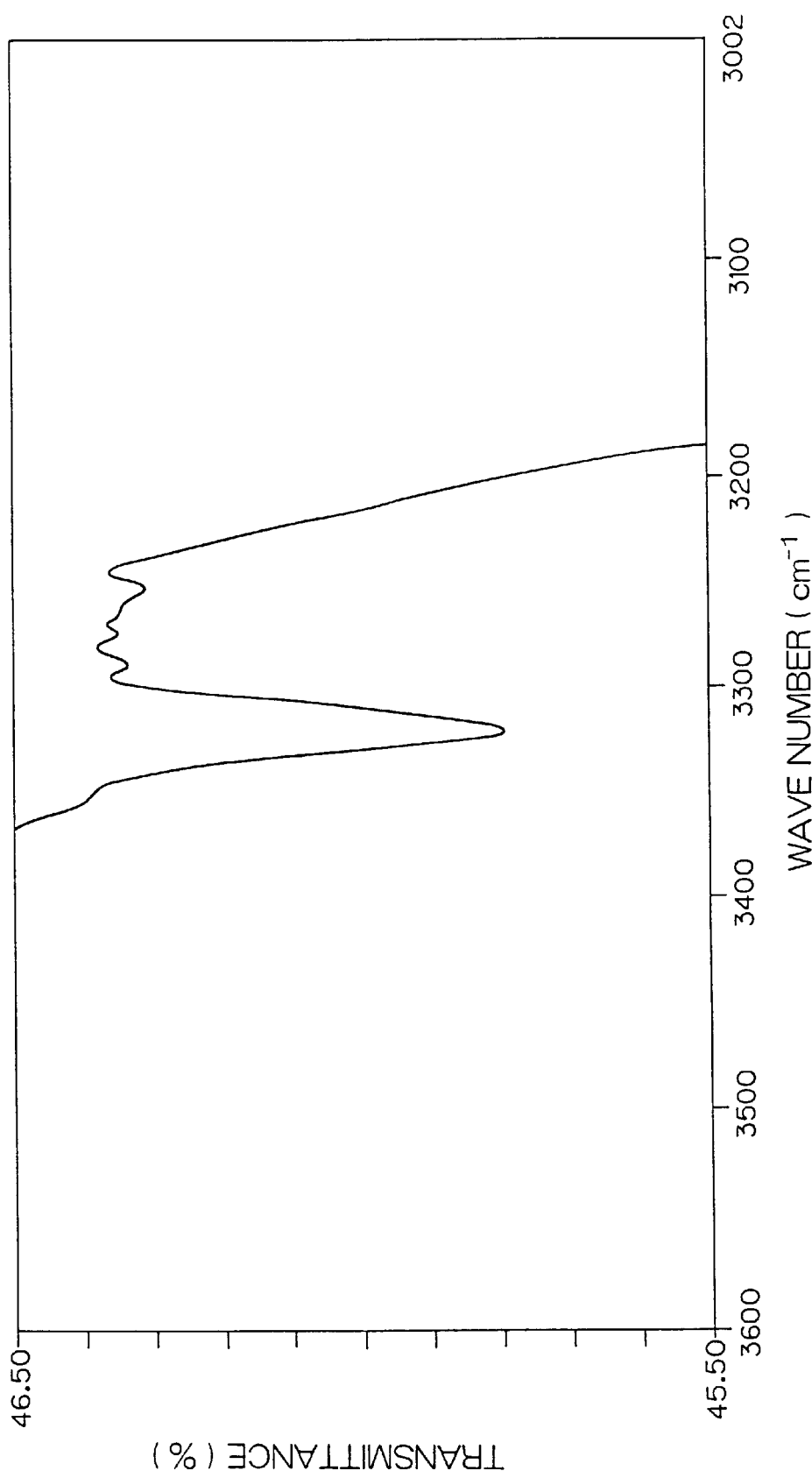
FIG. 2 is a graph showing an infrared absorption spectrum of the solid film obtained in Example 10.

The results of the nitrogen content and infrared absorption spectrum of Examples 9 and 10 and Comparative Example 6 are shown in Table 3. Graphs showing the infrared absorption spectrum are shown in FIGS. 1 to 3.

TABLE 3

|  | Nitrogen content | Infrared absorption spectrum | |
| --- | --- | --- | --- |
|  | N (%) | 3320 $cm^{-1}$ | 3280 $cm^{-1}$ |
| Example 9 | 0.038 | detected | slightly detected |
| Example 10 | 0.018 | detected | not detected |
| Comp. Example 6 | 0.11 | not detected | Detected |

As is apparent from Table 3, in Example 10, an absorption at 3320 $cm^{-1}$ derived form short-chain peptide or amino acid was detected, however, the nitrogen content was drastically low and any absorption derived from polymer peptide was not detected. Accordingly, there could be obtained a latex having the safety to the human body, wherein the occurrence of allergy was sufficiently suppressed.

In Example 9, an absorption at 3280 $cm^{-1}$ derived form polymer peptide was slightly detected, however, the nitrogen content could be suppressed to a drastically low value like Example 10, thereby suggesting the fact that there could be obtained a latex having the safety to the human body, wherein the occurrence of allergy was sufficiently suppressed.

On the other hand, in Comparative Example 6, not only the nitrogen content is large but also an absorption at 3280 $cm^{-1}$ derived form polymer peptide was detected, thereby suggesting that allergy is likely to occur.

As described above in detail, according to the deproteinizing agent of the present invention, since the deproteinizing agent contains a proteolytic enzyme and at least one cationic surfactant selected from the group consisting of alkylamine salt, alkylamine derivative and quaternized compounds thereof as an active component, a stable cationic deproteinized natural rubber latex can be prepared in a simple manner by efficiently removing a protein in the natural rubber.

The disclosure of Japanese Patent Application No. 11-257564, filed on Sep. 10, 1999, is incorporated herein by reference.

What is claimed is:

1. A deproteinizing agent comprising a proteolytic enzyme and one or more cationic surfactants selected from the group consisting of an alkylamine salt, an alkylamine derivative and quaternized compounds thereof.

2. The deproteinizing agent according to claim 1, wherein the proteolytic enzyme is alkaline protease.

3. A method of preparing a cationic deproteinized natural rubber latex, which comprises adding the deproteinizing agent of claim 1 to a field latex or ammonia-treated latex thereby subjecting the latex to a deproteinization treatment, and purifying the rubber particles in the latex.

4. The method of preparing a cationic deproteinized natural rubber latex according to claim 3, wherein the deproteinizing agent is added so that the content of the cationic surfactant in the deproteinizing agent is within a range of from 0.1 to 20 parts by weight based on 100 parts by weight of the rubber solid content in the latex.

5. The method of preparing a cationic deproteinized natural rubber latex according to claim 3, wherein the deproteinizing agent is added so that the content of the proteolytic enzyme in the deproteinizing agent is within a range from 0.0001 to 20 parts by weight based on 100 parts by weight of the rubber solid content in the latex.

* * * * *